Sept. 2, 1952 L. A. BERGSTROM 2,609,124
FERTILIZER SPREADER
Filed May 18, 1949 2 SHEETS—SHEET 2

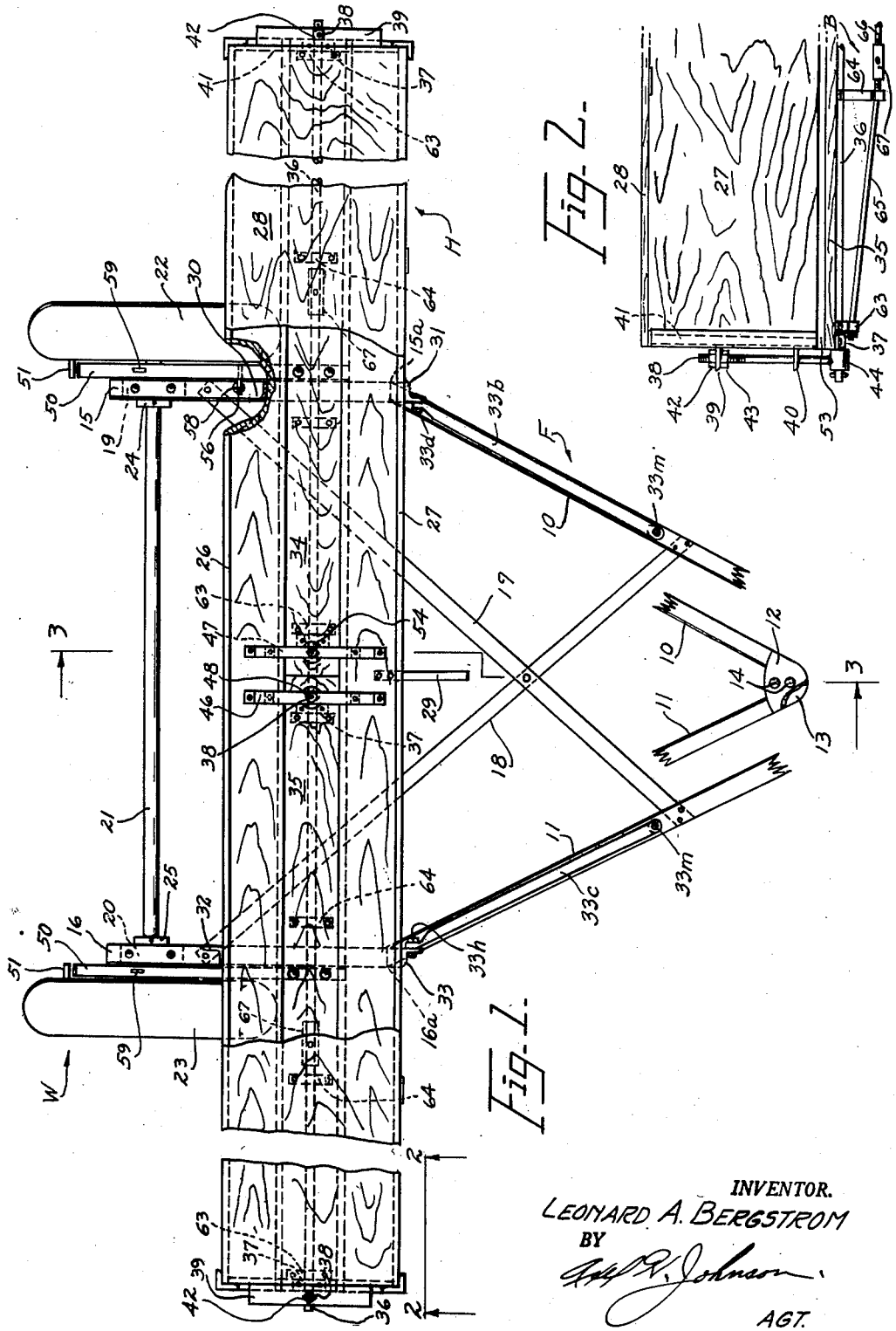

INVENTOR.
LEONARD A. BERGSTROM
BY
AGT.

Patented Sept. 2, 1952

2,609,124

UNITED STATES PATENT OFFICE 2,609,124

FERTILIZER SPREADER

Leonard A. Bergstrom, Racine, Wis.

Application May 18, 1949, Serial No. 94,005

4 Claims. (Cl. 222—177)

This invention relates to a lime and fertilizer spreader.

Conventional lime and fertilizer spreaders have hoppers and distributing mechanisms made of metal which is soon attacked by the salts of the fertilizer which render the spreader inoperable or to become so rusted as to require repairing or discarding. Wherever wood or similar material can be used in the construction of the hopper or distributing mechanism it is advisable to do so.

Conventional spreaders give trouble in that fertilizer which has formed in lumps will not feed and ultimately clog the mechanism with the result that the feeding stops entirely. Feeding can only be resumed by removing the fertilizer and crushing the lumps before replacing the fertilizer.

An object is to provide a spreader having working parts that will not be liable to attack by the salts of the fertilizer.

Another object of this invention is to provide a spreader having a minimum number of working parts.

Another object is to provide a spreader having convenient adjustments for the regulation of the rate of distribution.

Another object is to provide a spreader that will crush lumps of fertilizer thereby obviating clogging prevalent in conventional spreaders.

Another object is to provide a spreader that will distribute the fertilizer in a uniform layer.

Another object is to provide a spreader that will automatically compensate for the variation in quantity distributed when operating in a curve.

Another object is to provide a spreader which can be readily converted into a load-carrying trailer.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings:

Fig. 1 is a plan view of the spreader with parts broken away;

Fig. 2 is an elevational view taken at 2—2 of Fig. 1;

Figure 3:
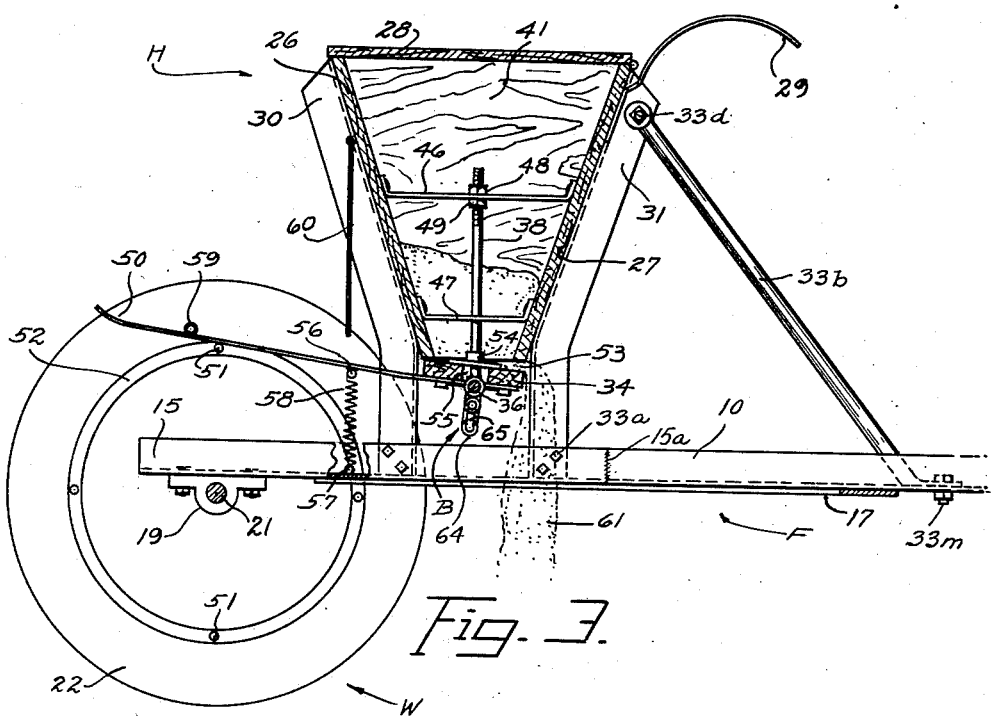
Fig. 3 is a sectional view taken at 3—3 of Fig. 1 and showing the bottom panel in forward-feeding position.

Broadly described this invention comprises a wheel supported transport frame F supporting a fertilizer hopper H. The hopper H being so arranged as to allow removal to permit the wheel supported frame to be used as a trailer thereby providing an implement with a dual purpose.

Referring to the invention in detail, the transport frame F comprises a pair of rearwardly diverging angle members 10 and 11. Angle members 10 and 11 are secured together at the front by plates 12 and 13, these plates being fastened as shown by welding or other suitable means of fastening. Plates 12 and 13 also serve as hitch means by the provision of holes 14 which accommodate a hitch pin. Angle members 15 and 16 form the side rails of the frame F, and are welded or otherwise secured to angle members 10 and 11. Cross braces 17 and 18 are provided to strengthen the frame 10 and are riveted or bolted or otherwise fastened in place as shown in Fig. 1.

Bearing blocks 19 and 20 in the present instance are bolted to angle members 15 and 16 as shown in Fig. 1, and provide the means of securing an axle shaft 21 to the side rails 15 and 16, and which axle is supported by wheels 22 and 23. Wheels 22 and 23 are free to rotate and are held axially on shaft 21 by any suitable means such as a nut or cotter pin which means are conventional and not shown. Stop collars 24 and 25 are pinned to shaft 21 to prevent axial displacement.

Hopper H comprises side members 26 and 27 which converge inwardly toward the bottom. A cover 28 is provided to protect the fertilizer from the weather. Cover 28 is hinged as shown and a cover stop 29 is secured to hopper H to support cover 28 when the latter is open.

Hopper H is supported on frame F by angle legs 30, 31, 32 and 33. These legs are secured to hopper H and extend a substantial distance below the bottom of the hopper. The lower ends of legs 30, 31, 32 and 33 are provided with holes which correspond to holes in frame F, and through which bolts 33a or the like are engaged for holding the hopper in place. When it is desired to use the transport frame as a trailer it is merely necessary to remove the hopper from the frame. A box or other receptacle may then be mounted upon the frame F.

In order that the necessary support may be provided for the hopper H, a pair of braces 33b and 33c are employed. Braces 33b and 33c in this instance are of tubular construction with flattened ends and are secured at their upper ends to angle legs 31 and 33, respectively, by bolts 33d and 33h. The lower ends of braces 33b and 33c are bolted to angle members 10 and 11 by bolts 33m and 33n.

The bottom of hopper H is closed by bottom panels 34 and 35 which are vertically adjustable relative to the bottom edge of the hopper H. Panels 34 and 35 are supported by a shaft 36 which extends longitudinally of the hopper H. Clips 37 formed to fit beneath shaft 36 are bolted or otherwise suitably secured to the panels 34 and 35 as indicated, but allow freedom for rocking of the panels relative to the shaft. Shaft 36 is supported beneath the hopper H by hangers 38, four being required in this instance, one hanger being located at each end of hopper H and two at the middle at the inner ends of panels 34 and 35. The first mentioned hangers are supported by angle members 39 and 40 which are fastened to the ends 41 of the hopper H, holes being provided in members 39 and 40 for reception of the hangers 38. Hangers 38 are threaded as shown in Fig. 2 and nuts 42 and 43 engaged respectively above and below member 39 provide a means of adjustment, and a locking arrangement when the adjustment has been made. A boss 44 is provided at the lower end of each of the hangers 38, and shaft 36 is supported therein.

Hangers 36 which are positioned near the inner ends of bottom panels 34 and 35 are supported in brackets 46 and 47, two of each being required. Brackets 46 and 47 are provided with holes through which hangers 38 freely pass. Nuts 48 and 49 engaged above and below brackets 46 serve to provide adjusting and locking means for hangers 38. It will be clear that the bottom panels 34 and 35 can be adjusted to provide a lesser or greater space between their upper surfaces and the bottom edges of hopper H by means of nuts 48 and 49. The above adjustment provides for increasing or decreasing the quantity of fertilizer being distributed per acre. When the proper adjustment has been made nuts 42—43 and 48—49 are tightened to maintain the adjustment desired.

Figure 4:
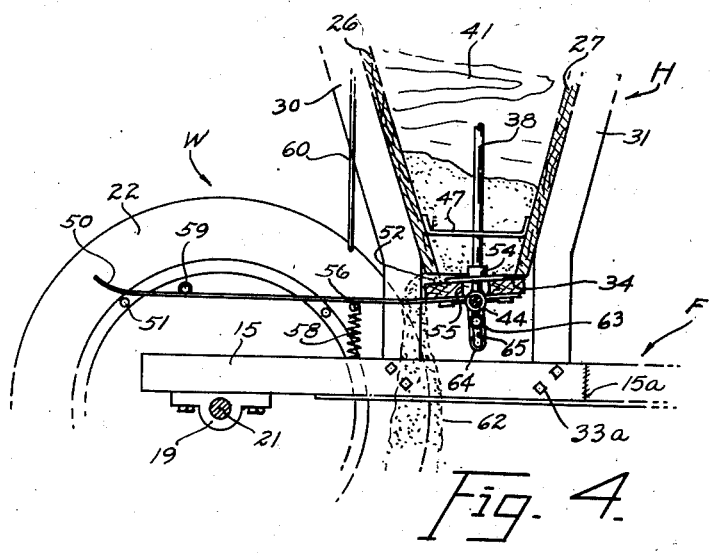
Fig. 4 is similar to Fig. 3 with the exception that the bottom panel is shown in rearward-feeding position.

Figs. 3 and 4 show details connected with the means of actuating the distributing mechanism. Actuating levers 50 extend rearwardly and are secured one to each of the bottom panels 34 and 35. Each bottom panel is independently vibrated or rocked on shaft 36 so as to alternately open and close the spaces between the panels and the bottom edges of the hopper H. When the spreader is traveling in a straight line both panels vibrate at the same rate. However, when a turn is made the panel at the outside of the turn vibrates at a faster rate so as to distribute the fertilizer in proportion to the ground traversed.

Actuating pins 51 are secured to the inner side of rims 52. There are four pins in this instance. As wheels 22 and 23 rotate, pins 51 engage the underside of actuating levers 50 lifting the latter as shown in Fig. 3, resulting in a rocking motion being imparted to panels 34 and 35. When the wheel continues to rotate, the lever 50 is allowed to assume the position shown in Fig. 4. Fertilizer pours from the gaps 52 and 53 alternately. It will be clear that lumps which form in the fertilizer will be crushed between the panels 34 and 35 and the bottom edges of the hopper H. This feature prevents clogging which often happens in the conventional spreader. A rubber or leather sealing washer 54 is placed on hangers 38 located at the middle of hopper H in contact with panels 34 and 35 so as to prevent leakage of fertilizer about the hangers through clearance holes 55.

A member 56 is welded to each of the arms 50 and extends laterally. A cotter 57 or similar means is secured to each of the angle members 15 and 16, and a tension spring 58 connects each member 56 and cotter 57. This construction maintains a positive contact between arms 50 and pins 51.

A bracing arrangement B is attached beneath each of panels 34 and 35. Such bracing is necessary to prevent downward bowing of the panels between the hangers 38 under the weight of the fertilizer in the hopper. Bowing would allow an excessive amount of fertilizer to flow at the middle of each panel. Bracing B in this instance comprises anchor means 63 secured one near each end of panels 34 and 35. Support hangers 64 are located at convenient positions on panels 34 and 35 as shown in Figs. 1 and 2. Tie rods 65 and 66 are anchored in anchor means 63 at their ends. The associated ends of tie rods 65 and 66 are provided with a right hand thread on one and a left hand thread on the other to accommodate a turn buckle 67, one turnbuckle being provided for each panel. Turn buckles 67 are kept adjusted so that panels 34 and 35 are substantially flat when the hopper is loaded with fertilizer. Other well-known means are contemplated for tensioning the tie-rods.

In operation the spreader is hitched to a tractor or other suitable means of transportation. The nuts 42, 43, 48 and 49 are adjusted to obtain the desired opening between the hopper bottom and the panels 34 and 35. As the wheels 22 and 23 rotate, the actuating means 51 contact actuating arms 50 resulting in the rocking of panels 34 and 35 in a clockwise direction and thereby allowing fertilizer to pour from gap 53 in a stream 61 as shown in Fig. 3. The continued rotation of wheels 22 and 23 carries the actuating means 51 to a point where it no longer contacts arm 50 whereby the latter is biased by spring 58 so as to rock the panels 34 and 35 in a counter-clockwise direction thereby allowing fertilizer to pour from gap 52 in a stream 62 as shown in Fig. 4. It will be clear that as the spreader is being transported over the ground the panels 34 and 35 will be so actuated that gaps 52 and 53 will be alternately opened and closed resulting in dropping of fertilizer alternately from the front and rear of hopper H.

One feature of the operation of this invention is that lumps of fertilizer will be crushed as they are caught between the bottom of the hopper H and the rocking of the panels 34 and 35 as the edges of the latter alternately make contact with the hopper. Therefore there is no danger of this spreader clogging because of lumpy fertilizer.

When the spreader is being transported about a curve the outer wheel will travel a greater distance and rotate at a greater rate, with the result that the panel associated with the outer wheel will rock at a faster rate and distribute an increased amount of fertilizer. The inner wheel then travels a shorter distance and rotates at a slower rate and will distribute a smaller quantity of fertilizer. This mode of operation tends to distribute the fertilizer more evenly when rounding a curve.

Suitable eyelets 59 are secured to the upper surface of each of the actuating arms 50 as shown in Figs. 1, 3 and 4. Latches 60 are freely pivoted to the side member 26 and have hook portions at their lower ends. Latches 60 are of a proper length so that they can be hooked into the corresponding eyelets 59, thereby holding arms 50 out of engagement with the actuating means 51. The purpose in holding arms 50 out of engagement is to interrupt the oscillations of the panels 34 and 35 when the implement is being transported, to avoid waste of the material in the hopper.

The above being a complete description of an illustrative embodiment of the invention, what is claimed as new and desired to be secured by Letters Patent of the United States is:

1. In a spreader having a frame and transport wheels, a hopper supported on said frame and having an open bottom, a plurality of independent mutually abutting panels aggregatively co-extensive with said open bottom and the horizontal edges thereof, and adjustable toward or away therefrom, pivot means adapted to support said panels for rocking relation with said bottom, a plurality of actuating means extending laterally from said support wheels, and an actuating arm extending from each of said panels into position to co-act with said actuating means to effect an alternate clockwise and counterclockwise partial rotation of said panels about said shaft upon rotation of said transport wheels.

2. In a spreader for pulverulent material having a frame, transport wheels and a longitudinal hopper for fertilizer, said hopper having a longitudinal bottom aperture, a pair of panels laterally abutting and co-extensive with said aperture and adapted to be adjusted toward or away from said bottom aperture, a longitudinally extending shaft adapted to pivotally support said panels for rocking movement relative to said aperture and means associated with said transport wheels and said panels to rock the panels to allow material to flow alternately from the longitudinal opposite edges of said panels, comprising laterally extending actuating members secured to said wheels; said actuating arms secured to each of said panels, each of said arms extending adjacent one of said wheels and co-acting with said members to rock said panels.

3. In a spreader for pulverulent material provided with independently rotatable transport wheels and a hopper having a bottom allowing escape of said material, a shaft supported below said hopper, two endwise abutting panels rockably pivoted on said shaft and spaced below said bottom and co-extensive therewith, actuating projections secured to said transport wheels, and means secured to said panels and extending into operative position with said projections so as to effect a rocking motion of said panels upon rotation of said transport wheel, said rocking motion effecting a flow of said material alternately from front and rear edges of said panels.

4. In a fertilizer spreader having a longitudinally-extending open-bottom hopper, a pair of abutting rockable panels below said hopper and pivoted on a longitudinal axis, and a truss on each of said panels to prevent distortion of said panels by the weight of the fertilizer.

LEONARD A. BERGSTROM.

REFERENCES CITED

The following references are of record in the file of this patent:

UNITED STATES PATENTS

| Number | Name | Date |
|---|---|---|
| 660,600 | Taplin | Oct. 30, 1900 |
| 800,847 | Herrick | Oct. 3, 1905 |
| 971,338 | Adams | Sept. 27, 1910 |
| 977,290 | Fremet | Nov. 29, 1910 |
| 2,350,107 | Gandrud | May 30, 1944 |